US012210304B2

(12) United States Patent
Ueno et al.

(10) Patent No.: US 12,210,304 B2
(45) Date of Patent: Jan. 28, 2025

(54) HEATER AND IMAGE FORMING APPARATUS

(71) Applicant: Toshiba Lighting & Technology Corporation, Yokosuka (JP)

(72) Inventors: Kousuke Ueno, Ehime-ken (JP); Masahiko Tamai, Ehime-ken (JP); Shinjiro Aono, Ehime-ken (JP); Akio Tsubouchi, Ehime-ken (JP); Tsuyoshi Ohashi, Ehime-ken (JP); Satoko Kato, Ehime-ken (JP); Masahiro Doi, Ehime-ken (JP); Makoto Sakai, Ehime-ken (JP)

(73) Assignee: Toshiba Lighting & Technology Corporation, Yokosuka (JP)

( * ) Notice: Subject to any disclaimer, the term of this patent is extended or adjusted under 35 U.S.C. 154(b) by 0 days.

(21) Appl. No.: 18/461,816

(22) Filed: Sep. 6, 2023

(65) Prior Publication Data

US 2024/0077819 A1 Mar. 7, 2024

(30) Foreign Application Priority Data

Sep. 7, 2022 (JP) ................................ 2022-142418
Nov. 29, 2022 (JP) ................................ 2022-189890

(51) Int. Cl.
*G03G 15/20* (2006.01)
*G03G 15/00* (2006.01)
(Continued)

(52) U.S. Cl.
CPC ..... *G03G 15/2053* (2013.01); *G03G 15/2042* (2013.01); *G03G 15/5045* (2013.01);
(Continued)

(58) Field of Classification Search
CPC ........... G03G 15/2042; G03G 15/2053; G03G 15/5045; G03G 2215/00523;
(Continued)

(56) References Cited

U.S. PATENT DOCUMENTS

| | | | | |
|---|---|---|---|---|
| 6,787,737 | B2 | 9/2004 | Uekawa et al. | |
| 2003/0042241 | A1 | 3/2003 | Uekawa et al. | |
| 2021/0072682 | A1* | 3/2021 | Tamai ................ | G03G 15/2053 |

FOREIGN PATENT DOCUMENTS

| | | | |
|---|---|---|---|
| JP | 2003-131502 A | | 5/2003 |
| JP | 2020149832 A | * | 9/2020 |

OTHER PUBLICATIONS

Translation of JP 2020-149832 A, publication date of Sep. 17, 2020.*

* cited by examiner

*Primary Examiner* — Sophia S Chen
(74) *Attorney, Agent, or Firm* — Banner & Witcoff, Ltd.

(57) ABSTRACT

Provided is a heater including: a substrate that has electrical conductivity; a first insulation portion that is provided on a first surface of the substrate, has an insulation property; at least one heat generation body that is provided on the first insulation portion; a second insulation portion that is provided on a second surface of the substrate which is opposite to the first surface, has an insulation property; at least one detection unit that is provided on at least one of the first insulation portion and the second insulation portion; and a first wiring which is provided on at least one of the first insulation portion and the second insulation portion, and in which one end is electrically connected to one terminal of the detection unit and the other end is electrically connected to the substrate having the electrical conductivity.

15 Claims, 6 Drawing Sheets

(51) Int. Cl.
*H05B 3/00* (2006.01)
*H05B 3/18* (2006.01)

(52) U.S. Cl.
CPC . *H05B 3/0095* (2013.01); *G03G 2215/00523* (2013.01); *G03G 2215/00801* (2013.01)

(58) Field of Classification Search
CPC . G03G 2215/00801; G03G 2215/2003; G03G 2215/2035; H05B 3/0095
See application file for complete search history.

HEATER AND IMAGE FORMING APPARATUS

CROSS-REFERENCE TO RELATED APPLICATIONS

This application is based upon and claims the benefit of priority from Japanese Patent Application No. 2022-142418, filed on Sep. 7, 2022, and Japanese Patent Application No. 2022-189890, filed on Nov. 29, 2022; the entire contents of which are incorporated herein by reference.

FIELD

Embodiments described herein relate generally to a heater and an image forming apparatus.

BACKGROUND

A heater configured to fix a toner is provided in an image forming apparatus such as a copier and a printer. In addition, the heater is also provided in a print erasure device provided in a rewritable card reader and writer, and the like. Typically, the heater includes an elongated substrate, a heat generation body that is provided on one surface of the substrate and extends in a longitudinal direction of the substrate, and a pair of terminals electrically connected to both ends of the heat generation body. In addition, the substrate may be provided with a thermistor for performing temperature control on the heat generation body.

Typically, the heat generation body is provided on one surface of the substrate, and the thermistor is provided on a surface of the substrate which is opposite to the surface provided with the heat generation body. However, in this configuration, heat of the heat generation body is less likely to be transferred to the thermistor, and thus there is a concern that temperature control accuracy of the heater deteriorates. Therefore, there is a concern that heat generation efficiency of the heat generation body may deteriorate.

In addition, the heat generation body and the thermistor may be provided on one surface of the substrate, and the heat generation body and the thermistor may be provided in parallel with each other in a lateral direction (width direction) of the substrate. However, when the heat generation body and the thermistor are simply provided in parallel with each other in the lateral direction of the substrate, the number of wirings which are provided on the one surface of the substrate and are connected to the heat generation body and the thermistor increases or dimensions of the substrate in the lateral direction are lengthened, and thus a reduction in size of the heater becomes difficult.

Here, there is a demand for development of a technology capable of accomplishing a reduction in size of the heater with a simple configuration.

DETAILED DESCRIPTION

Figure 1:
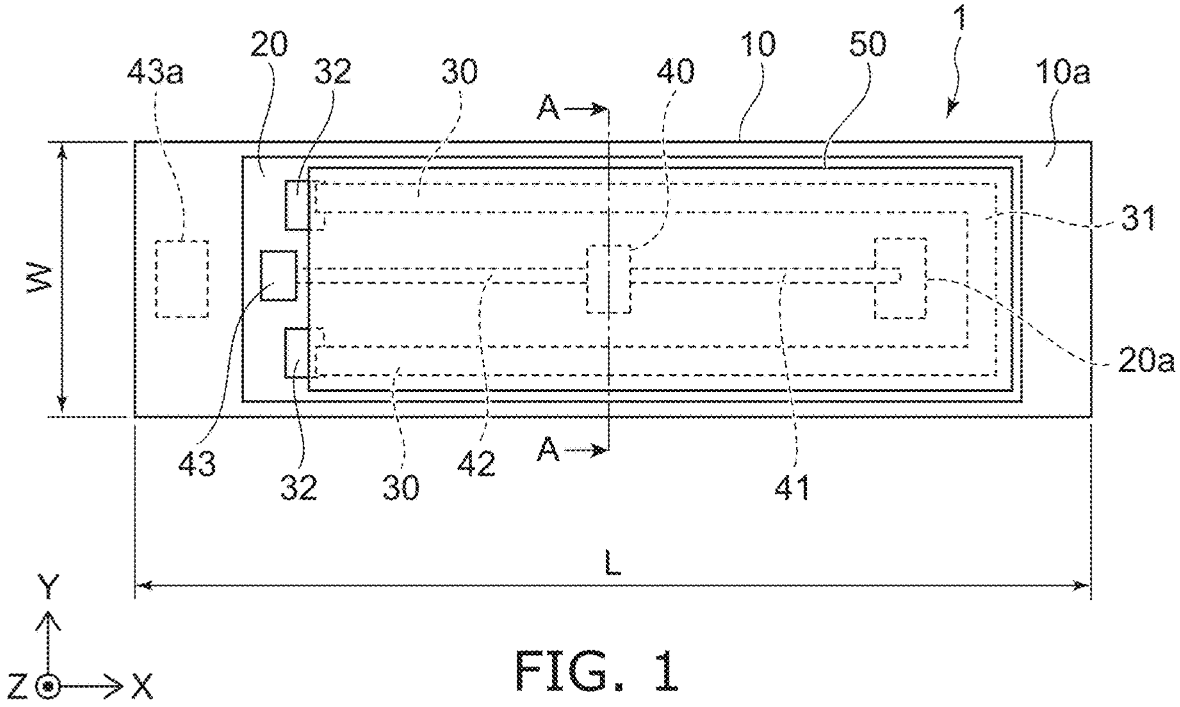
FIG. 1 is a schematic view when a heater according to an embodiment is viewed from one side in a Z-direction.

A heater according to an exemplary embodiment includes: a substrate that has electrical conductivity, and extends in a first direction; a first insulation portion that is provided on a first surface of the substrate, has an insulation property, and extends in the first direction; at least one heat generation body that is provided on the first insulation portion and extends in the first direction; a second insulation portion that is provided on a second surface of the substrate which is opposite to the first surface, has an insulation property, and extends in the first direction; at least one detection unit that is provided on at least one of the first insulation portion and the second insulation portion; and a first wiring which is provided on at least one of the first insulation portion and the second insulation portion and extends in the first direction, and in which one end is electrically connected to one terminal of the detection unit and the other end is electrically connected to the substrate having the electrical conductivity.

Hereinafter, an exemplary embodiment will be exemplified with reference to the accompanying drawings. Note that, in the drawings, the same reference numeral will be given to a similar constituent element, and detailed description will be appropriately omitted. In addition, arrows X, Y, and Z in the drawings represent three directions orthogonal to each other. For example, a longitudinal direction of a substrate is set as the X-direction (corresponding to an example of a first direction), a lateral direction (width direction) of the substrate is set as the Y-direction (corresponding to an example of a second direction), and a direction orthogonal to surfaces of the substrate is set as the Z-direction.

(Heater) FIG. 1 is a schematic view when a heater 1 according to this embodiment is viewed from one side in a Z-direction.

Figure 2:
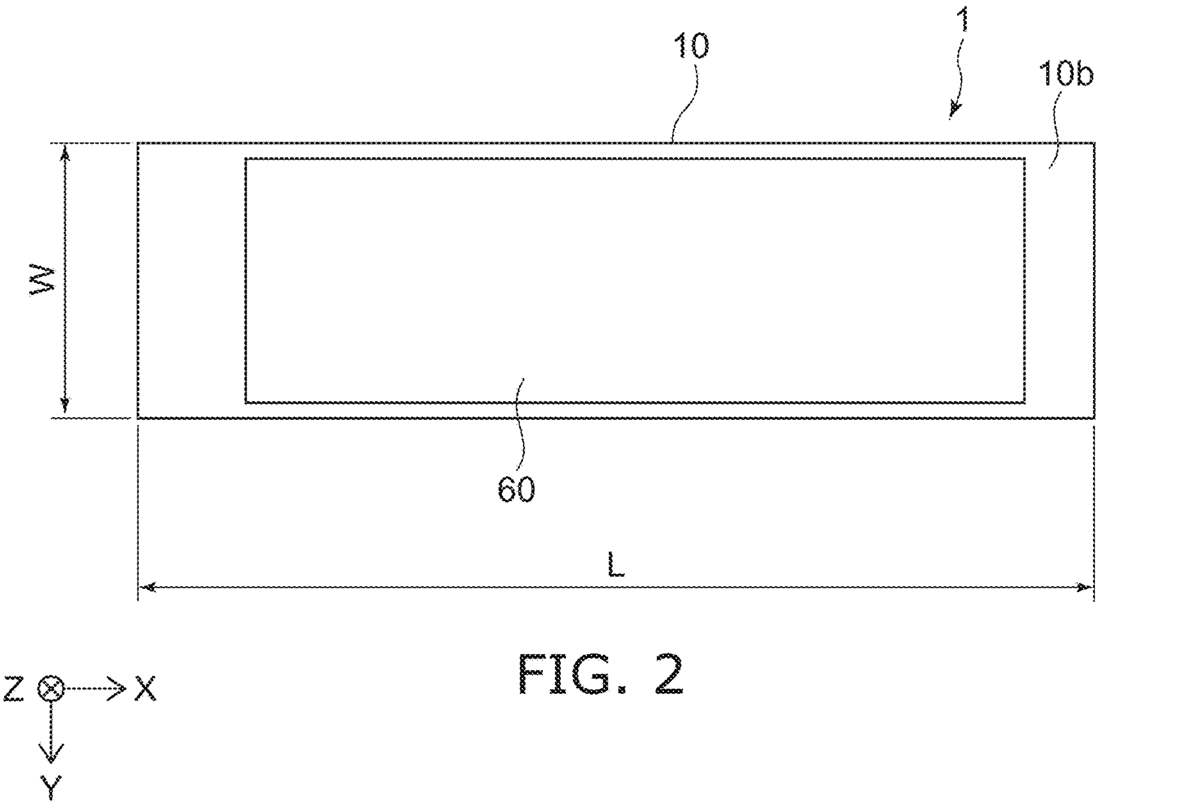
FIG. 2 is a schematic view when the heater is viewed from the other side in the Z-direction.

FIG. 2 is a schematic view when the heater 1 is viewed from the other side in the Z-direction.

Figure 3:
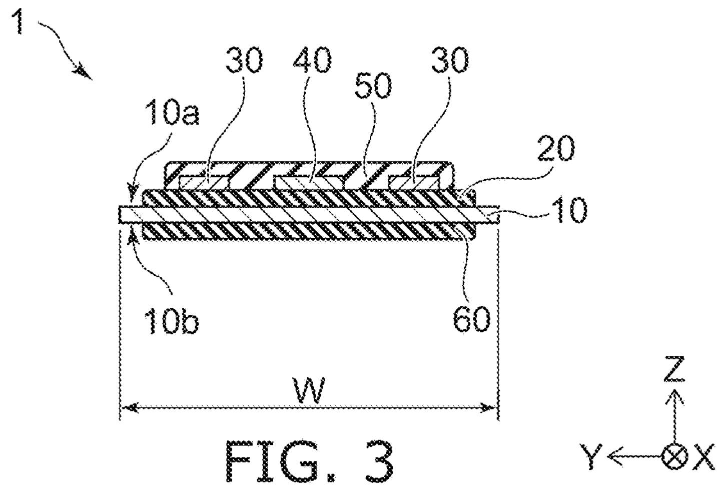
FIG. 3 is a schematic cross-sectional view of the heater in a direction of line A-A in FIG. 1.

FIG. 3 is a schematic cross-sectional view of the heater 1 in a direction of line A-A in FIG. 1.

As illustrated in FIG. 1 to FIG. 3, for example, the heater 1 includes a substrate 10, an insulation portion 20 (corresponding to an example of a first insulation portion), a heat generation body 30, a detection unit 40, a protective portion 50 (corresponding to an example of a first protective portion), and an insulation portion 60 (corresponding to an example of a second insulation portion).

The substrate 10 has a plate shape and includes a surface 10*a* (corresponding to an example of a first surface), and a surface 10*b* (corresponding to an example of a second surface) opposite to the surface 10*a*. The substrate 10 has a shape extending in one direction (for example, the X-direction). For example, a planar shape of the substrate 10 is an elongated rectangular shape. For example, the thickness of the substrate 10 is approximately 0.5 to 1.0 mm. For example, a width dimension W (a dimension in a lateral direction; a dimension in the Y-direction) of the substrate 10 is approximately 5 to 15 mm. A length L (a dimension in a longitudinal direction; a dimension in the X-direction) of the substrate 10 can be appropriately changed in correspondence with a size of a heating object (for example, paper) or the like.

The substrate 10 is formed from a material having heat resistance and electrical conductivity. Typically, a substrate is formed from ceramics such as an aluminum oxide, but the heater 1 according to this embodiment is provided with the substrate 10 containing a metal. Examples of the metal include stainless steel, an aluminum alloy, and the like.

As illustrated in FIG. 1 and FIG. 3, the insulation portion 20 has an insulation property, and is provided on the surface 10*a* of the substrate 10. The insulation portion 20 is provided to insulate the substrate 10 having electrical conductivity, and the heat generation body 30 and the detection unit 40. Accordingly, the insulation portion 20 is provided in a shape covering a region where the heat generation body 30 and the detection unit 40 are provided on the surface 10*a* of the substrate 10. In addition, the insulation portion is provided with a hole 20*a* passing through the insulation portion in a thickness direction. The insulation portion 20 is formed from a material having heat resistance and an insulation property. For example, the insulation portion 20 can be formed from inorganic materials such as ceramics and glass materials. For example, the insulation portion 20 can be formed by thermal spraying or firing.

The heat generation body 30 converts applied electric power to heat (joule heat). The heat generation body 30 is provided on the insulation portion 20 (a surface of the insulation portion 20 on a side opposite to the substrate 10 side). For example, the heat generation body 30 extends in the X-direction. A plurality of the heat generation bodies 30 can be provided. For example, the plurality of heat generation bodies 30 are provided in parallel with each other in the Y-direction with a predetermined interval. For example, as illustrated in FIG. 1 and FIG. 3, a pair of the heat generation bodies 30 can be provided.

For example, each of the heat generation bodies 30 is formed by using a ruthenium oxide ($RuO_2$), a silver-palladium (Ag—Pd) alloy, or the like. For example, the heat generation body 30 can be formed by applying a paste-shape material onto the insulation portion 20 by using a screen print method or the like, and by hardening the material by using a firing method or the like.

In addition, a wiring 31 that electrically connects the plurality of heat generation bodies 30 can be provided. The wiring 31 is provided on the insulation portion 20. At least one wiring 31 can be provided. For example, as illustrated in FIG. 1 and FIG. 3, the wiring 31 extends in the Y-direction, and is electrically connected to one end of the pair of heat generation bodies 30.

In addition, a terminal 32 (corresponding to an example of a second terminal) for electrically connecting the heat generation body to an external device or the like can be provided. The terminal 32 is electrically connected to one end of the heat generation bodies 30. For example, a pair of the terminals 32 can be provided. The pair of terminals 32 are provided on the insulation portion 20. For example, as illustrated in FIG. 1 and FIG. 3, in the X-direction, the pair of terminals 32 are electrically connected to ends of the heat generation bodies 30 on a side opposite to a side where the wiring 31 is provided. For example, the pair of terminals 32 can be provided in parallel with each other in the Y-direction with a predetermined interval. In addition, a wiring that electrically connects each of the terminals 32 and each of the heat generation bodies 30 can also be provided. When the wiring is provided between the terminal 32 and the heat generation body 30, the pair of terminals 32 can be provided at any position.

For example, the wiring 31 and the terminal 32 are formed by using a material containing silver, copper, or the like. For example, the wiring 31 and the terminal 32 can be formed by applying a paste-shaped material onto the insulation portion 20 by using a screen print method or the like, and by hardening the material by using a firing method or the like. When providing the wiring between the terminal 32 and the heat generation body 30, a material and a forming method of the wiring can be set to be similar to a material and a forming method of the wiring 31 and the terminal 32.

The detection unit 40 detects a temperature of the heat generation body 30. For example, the detection unit 40 may be set as a thermistor, a thermocouple, a temperature measuring resistor, or the like. The detection unit 40 exemplified in FIG. 1 is a thermistor. The detection unit 40 is provided on the insulation portion 20. In the Y-direction, the detection unit 40 can be provided in parallel with the heat generation body 30. For example, as illustrated in FIG. 1, the detection unit 40 can be provided between the heat generation bodies 30. In the X-direction, the detection unit 40 can be provided, for example, at a position in the vicinity of the center of the heat generation body 30. In the Y-direction, the detection unit 40 can be provided, for example, at a position in the vicinity of the center between the heat generation bodies 30. When the detection unit 40 is provided at the position, a distance between one of the heat generation bodies 30 and the detection unit 40 becomes approximately the same as a distance between the other heat generation body 30 and the detection unit 40. Accordingly, a variation in an in-plane temperature of the heater 1 can be suppressed from occurring.

In addition, a wiring 41 (corresponding to an example of a first wiring), a wiring 42 (corresponding to an example of a second wiring), and a terminal 43 (corresponding to an example of a first terminal) which are electrically connected to the detection unit 40 can be provided. The wiring 41, the wiring 42, and the terminal 43 are provided on the insulation portion 20. For example, as illustrated in FIG. 1, the wiring 41 and the wiring 42 extend in the X-direction. In the Y-direction, the wiring 41, the wiring 42, and the terminal 43 are provided between the heat generation bodies 30.

One end of the wiring 41 is electrically connected to one terminal of the detection unit 40. The other end of the wiring 41 is electrically connected to the surface 10*a* of the substrate 10 through the hole 20*a* of the insulation portion 20.

One end of the wiring 42 is electrically connected to the other terminal of the detection unit 40. The other end of the wiring 42 is electrically connected to the terminal 43. In the X-direction, the wiring 42 and the terminal 43 are provided on a side of the detection unit 40 which is opposite to the wiring 31 side. In the Y-direction, the terminal 43 may be provided in parallel with the terminal 32.

A material and a forming method of the wiring 41, the wiring 42, and the terminal 43 may be set to be similar to the material and the forming method of the wiring 31 and the terminal 32. In addition, the wiring 31, the terminal 32, the wiring 41, the wiring 42, and the terminal 43 can be formed simultaneously in the same forming process.

As illustrated in FIG. 1 and FIG. 3, the protective portion 50 is provided on the insulation portion 20, and extends in the X-direction. For example, the protective portion 50 covers the heat generation body 30, the wiring 31, the detection unit 40, the wiring 41, and the wiring 42. A dimension of the protective portion 50 in the X-direction can be made smaller than a dimension of the insulation portion 20. For example, the terminal 32 and the terminal 43 are exposed from the protective portion 50.

In addition, as illustrated in FIG. 1, in the X-direction, the vicinity of an end of the surface 10*a* of the substrate 10 on a side where the terminal 32 and the terminal 43 are provided is exposed from the insulation portion 20. As described above, the substrate is formed from a material having electrical conductivity. In addition, an end of the wiring 41 is electrically connected to the surface 10*a* of the substrate 10 through the hole 20*a* of the insulation portion 20. According to this, the substrate 10 functions as a wiring and a terminal which are electrically connected to the wiring 41. For example, as illustrated in FIG. 1, the vicinity of the end of the substrate 10 on a side where the terminal 32 and the terminal 43 are provided functions as a terminal 43*a* that is electrically connected to the wiring 41.

In the X-direction, when the terminal 32, the terminal 43, and the terminal 43*a* are provided in the vicinity of one end of the substrate 10, a harness connector for electrical connection with an external device can be mounted on one end of the heater 1. According to this, a wiring space of the heater 1 can be reduced, or wiring time of the heater 1 can be shortened.

In addition, the substrate 10 having electrical conductivity functions as a wiring that is electrically connected to the wiring 41, and thus it is not necessary to fold back the wiring 41 to the terminal 43 side. Accordingly, in the Y-direction, it is possible to reduce a space necessary for providing the detection unit 40. When the space necessary for providing the detection unit 40 is reduced, dimensions between the heat generation bodies 30 can be reduced. Accordingly, a reduction in size of the heater 1 is accomplished, or uniformity of an in-plane temperature of the heater 1 can be easily accomplished.

For example, the protective portion 50 has a function of insulating the heat generation body 30, the wiring 31, the detection unit 40, the wiring 41, and the wiring 42, a function of transferring heat generated in the heat generation body 30 to the outside, and a function of protecting the heat generation body 30 and the like from an external force, a corrosive gas, and the like. The protective portion 50 is formed from a material that has heat resistance and an insulation property, and has high chemical stability and heat conductivity. For example, the protective portion 50 is formed from inorganic materials such as ceramics and a glass material. In this case, the protective portion 50 can be formed by using a glass material to which a filler containing a material such as an aluminum oxide with high heat conductivity is added. The heat conductivity of the glass material to which the filler is added can be set to, for example, 2 [W/(m·K)] or more.

For example, the protective portion 50 can be formed by applying a paste-shaped material onto the insulation portion 20, the heat generation body 30, the wiring 31, the detection unit 40, the wiring 41, and the wiring 42 by using a screen print method or the like, and by hardening the material by using a firing method or the like.

The insulation portion 60 is provided to insulate the surface 10*b* side of the substrate 10 having electrical conductivity. For example, the thickness, a material, and a forming method of the insulation portion 60 can be set to be the same as the thickness, the material, and the forming method of the insulation portion 20 as described above.

Note that, the thickness of the insulation portion 60 can be made larger than the thickness of the insulation portion 20. For example, a thermal stress occurs due to a difference in a coefficient of thermal expansion of materials when using the heater 1, or when manufacturing the heater 1 (for example, when firing the protective portion 50 or the like). Therefore, there is a concern that warpage may occur in the heater 1 due to the thermal stress. When the warpage occurs in the heater 1, there is a concern that a distance between the heater 1 and an object to be heated varies, and heating unevenness may occur in the object to be heated.

In this case, a thermal stress generated due to the substrate 10, the insulation portion 20, and the protective portion 50 on the surface 10*a* side of the substrate 10 can be cancelled by a thermal stress generated due to the substrate 10 and the insulation portion 60 on the surface 10*b* side of the substrate 10. When the thermal stress is cancelled, warpage can be suppressed from occurring in the heater 1. In this case, when the thickness of the insulation portion 60 is made larger, a value of the thermal stress occurring on the surface 10*b* side of the substrate 10 can be made close to a value of the thermal stress occurring on the surface 10*a* side of the substrate 10. According to this, warpage can be more effectively suppressed from occurring in the heater 1. For example, the thickness of the insulation portion 60 can be set to a value that is approximately the sum of the thickness of the insulation portion 20 and the thickness of the protective portion 50.

Figure 4:
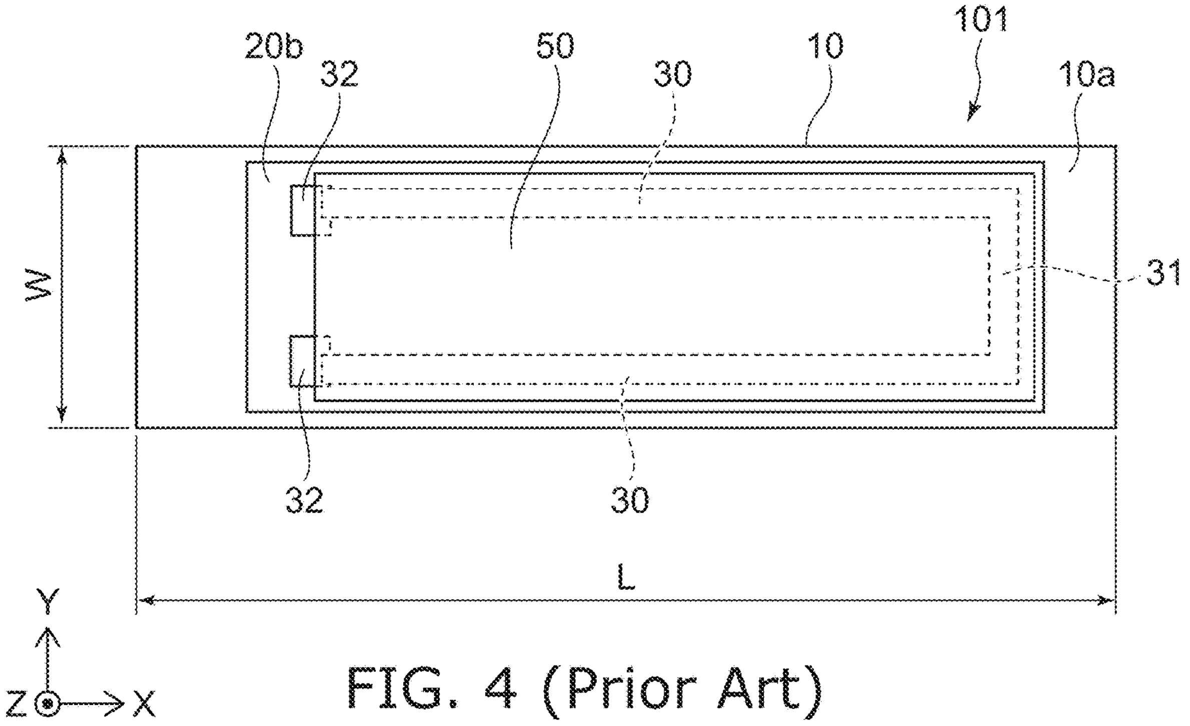
FIG. 4 (Prior Art)
FIG. 4 is a schematic view when a heater according to a comparative example is viewed from one side in the Z-direction.

FIG. 4 is a schematic view when a heater 101 according to a comparative example is viewed from one side in the Z-direction.

Figure 5:
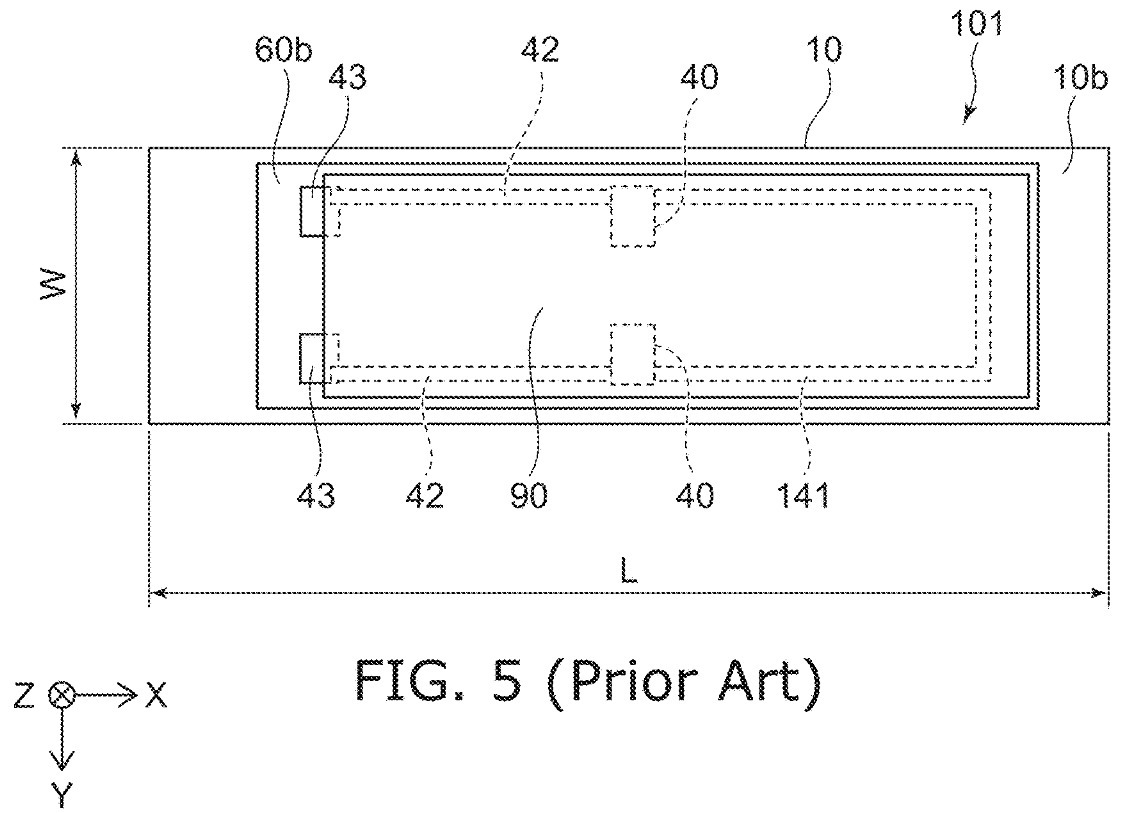
FIG. 5 (Prior Art)
FIG. 5 is a schematic view when the heater according to the comparative example is viewed from the other side in the Z-direction.

FIG. 5 is a schematic view when the heater 101 according to the comparative example is viewed from the other side in the Z-direction.

As illustrated in FIG. 4 and FIG. 5, the heater 101 includes the substrate 10, an insulation portion 20*b*, the heat generation body 30, the detection unit 40, the protective portion 50, the insulation portion 60*b* and the protective portion 90.

The insulation portion 20*b* is provided on the surface 10*a* of the substrate 10 as in the above-described insulation portion 20. Dimensions, a planar shape, a material, and the like of the insulation portion 20*b* can be set to be similar as in the insulation portion 20 as described above. However, the insulation portion 20*b* is not provided with the hole 20*a*.

In the heater 1 exemplified in FIG. 1, the detection unit 40 is provided on the surface 10*a* side of the substrate 10. In contrast, in the heater 101, as illustrated in FIG. 5, the detection unit 40 is provided on the surface 10*b* side of the substrate 10. Accordingly, it is necessary to provide the insulation portion 20*b* also on the surface 10*b* of the substrate 10.

In this case, since the heat generation body 30 is provided on the surface 10*a* side of the substrate 10, heat of the heat generation body 30 is less likely to be transferred to the detection unit 40. When the heat of the heat generation body 30 is less likely to be transferred to the detection unit 40, temperature control accuracy of the heater 101 (heat generation body 30) becomes low.

Therefore, in the Y-direction, a position of the detection unit 40 is set to be the same as a position of the heat generation body 30. In this configuration, a distance between the detection unit 40 and the heat generation body 30 can be shortened, and thus the temperature control accuracy of the heater 101 (heat generation body 30) can be improved. However, in this case, the same number of detection units 40 as the number of heat generation bodies 30 are necessary. In addition, when the number of the detection units 40 increases, a wiring 141 that electrically connecting the detection units 40 is necessary or the number of the wiring 42 and the terminal 43 increases. Note that, a material and a forming method of the wiring 141 can be set to be similar to the material and the forming method of the wiring 31 as described above. In addition, as described above, it is necessary to provide the insulation portion 60*b* also on the surface 10*b*of the substrate 10.

Therefore, an increase in the manufacturing cost of the heater 101 is caused.

Figure 6:
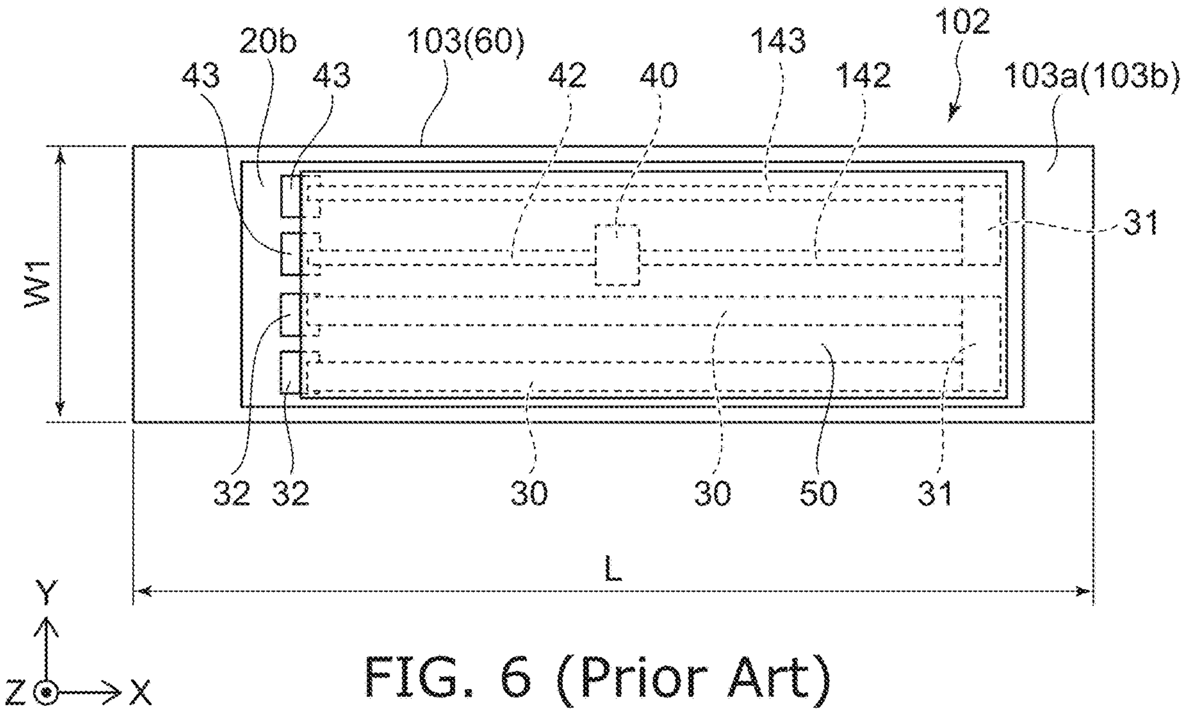
FIG. 6 (Prior Art)
FIG. 6 is a schematic view when a heater according to another comparative example is viewed from one side in the Z-direction.

FIG. 6 is a schematic view when a heater 102 according to another comparative example is viewed from one side in the Z-direction.

Note that, an aspect when the heater 102 is viewed from the other side in the Z-direction can be set to be similar as in FIG. 2. However, as to be described later, a width dimension W1 of a substrate 103 becomes larger than the width dimension W of the substrate 10.

As illustrated in FIG. 6, the heater 102 includes the substrate 103, the insulation portion 20*b*, the heat generation body 30, the detection unit 40, the protective portion 50, and the insulation portion 60.

As illustrated in FIG. 6, a length L, the thickness, a planar shape, a material, and the like of the substrate 103 can be set to be similar as in the above-described substrate 10. However, the width dimension W1 of the substrate 103 is larger than the width dimension W of the substrate 10.

The insulation portion 20*b* is provided on a surface 103*a* of the substrate 103. The insulation portion 60 is provided on a surface 103*b* of the substrate 103 which is opposite to the surface 103*a*.

As illustrated in FIG. 1, in the above-described heater 1, the detection unit 40 is provided between the heat generation bodies 30 in the Y-direction. In contrast, in the heater 102, the detection unit is provided on an outer side of a pair of the heat generation bodies in the Y-direction. In addition, the wiring 42, a wiring 142, a wiring 143, the wiring 31, and the terminal 43 which are electrically connected to the detection unit 40 are provided. The wiring 142 and the wiring 143 extend in the X-direction. The wiring 143 is provided in parallel with the wiring 42 and the wiring 142. One end of the wiring 142 is electrically connected to a terminal of the detection unit which is different from the terminal to which the wiring 42 is connected. The other end of the wiring 142 is electrically connected to the wiring 31. One end of the wiring 143 is electrically connected to the wiring 31. The other end of the wiring 143 is electrically connected to the terminal 43. A pair of the terminals 43 are provided. In the Y-direction, the pair of terminals 43 are provided in parallel with a pair of the terminals 32.

Here, in the Y-direction, when the detection unit 40 is provided on an outer side of the pair of heat generation bodies 30, a distance between one of the heat generation bodies 30 and the detection unit 40 becomes larger than a distance between the other heat generation unit 30 and the detection unit 40. According to this, temperature control accuracy with respect to the pair of heat generation bodies 30 is lowered. In addition, since the width dimension W1 of the substrate 103 becomes larger than the width dimension W of the substrate 10, a reduction in size of the heater 102 becomes difficult.

In contrast, in the heater 1 according to this embodiment, the heat generation body 30 and the detection unit 40 are provided on a surface of the substrate 10 on the same side. In addition, in the Y-direction, the detection unit 40 is provided between the heat generation bodies 30. According to this, a distance between the heat generation bodies 30 and the detection unit 40 can be shortened, and a distance between the detection unit 40 and one of the heat generation bodies 30 can be set to be substantially the same as a distance between the detection unit 40 and the other heat generation body 30. According to this, the temperature control accuracy with respect to the heat generation bodies 30 can be raised, and thus evenness of an in-plane temperature of the heater 1 can be accomplished.

In addition, since the heat generation body 30, the wiring 31, the terminal 32, the detection unit 40, the wiring 41, the wiring 42, and the terminal 43 are provided on one side of the substrate 10, simplification of a manufacturing process can be accomplished.

In addition, since the substrate 10 having electrical conductivity can be set as a wiring that is electrically connected to the wiring 41, it is not necessary to fold back the wiring 41 to the terminal 43 side. Accordingly, in the Y-direction, a space necessary for providing the detection unit 40 can be reduced, and thus the width dimension W of the substrate 10 can be reduced. When the width dimension W of the substrate 10 is reduced, a reduction in size of the heater 1 can be accomplished.

Figure 7:
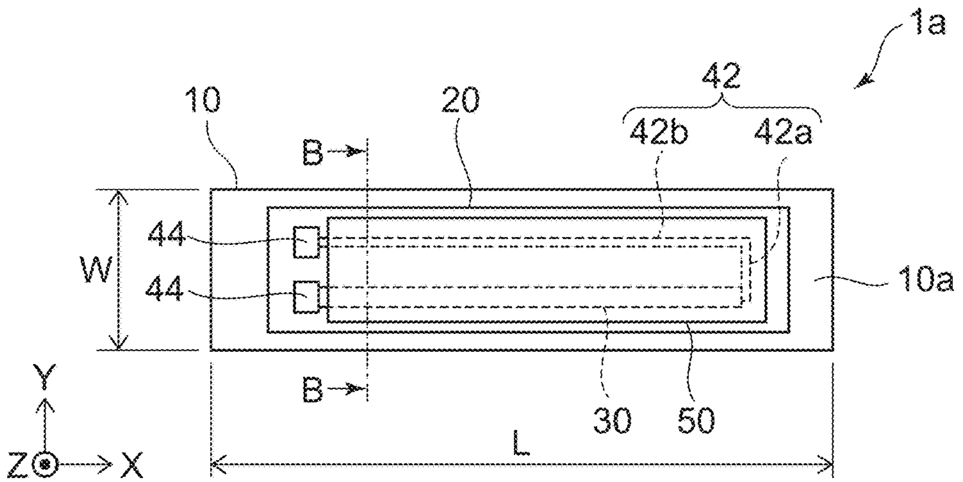
FIG. 7 is a schematic view when the heater according to another embodiment is viewed from one side in the Z-direction.

FIG. 7 is a schematic view when a heater 1*a* according to another embodiment is viewed from one side in the Z-direction.

Figure 8:
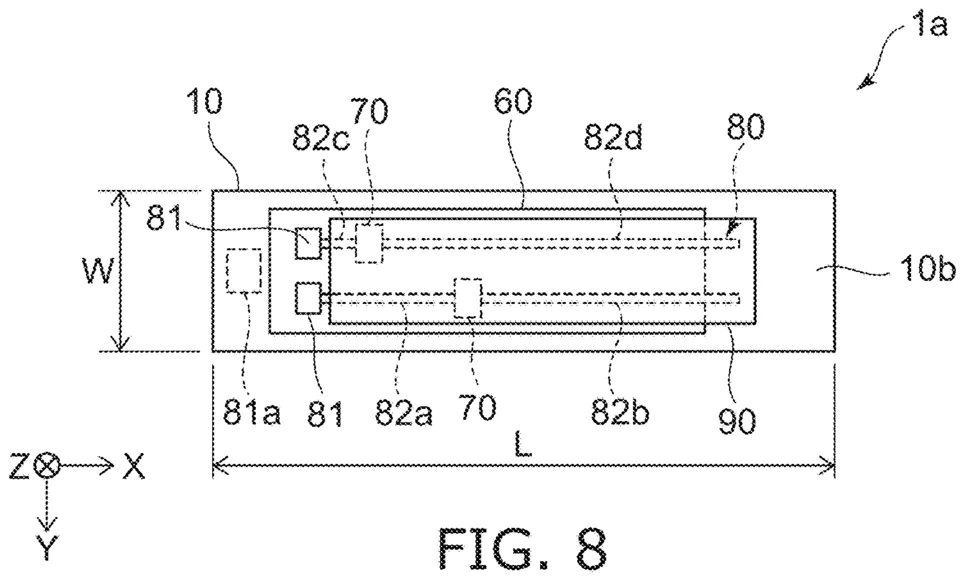
FIG. 8 is a schematic view when the heater is viewed from the other side in the Z-direction.

FIG. 8 is a schematic view when the heater 1*a* is viewed from the other side in the Z-direction.

Figure 9:
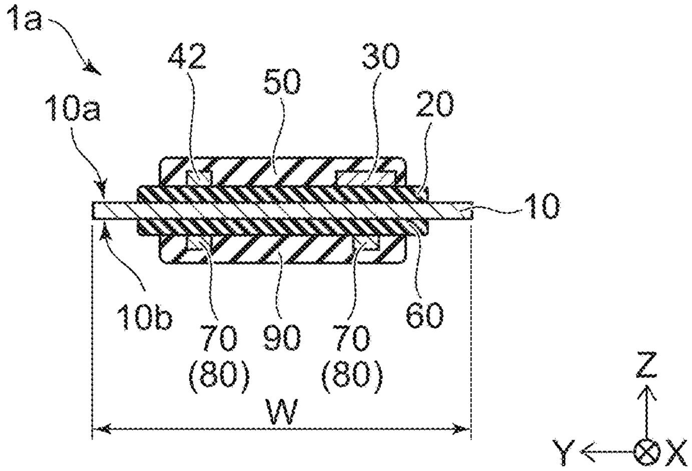
FIG. 9 is a schematic cross-sectional view of the heater in FIG. 7 in a direction of line B-B.

FIG. 9 is a schematic cross-section view of the heater 1*a* in FIG. 7 in a direction of line B-B.

As illustrated in FIG. 7 to FIG. 9, for example, the heater 1*a* includes the substrate 10, the insulation portion 20 (corresponding to an example of a first insulation portion), the heat generation body 30, the wiring 42, the protective portion 50, the insulation portion 60 (corresponding to an example of a second insulation portion), a detection unit 70, a wiring 80, and a protective portion 90.

The detection unit 70 detects a temperature of the substrate 10. The detection unit 70 may be set to be similar as the above-described detection unit 40. At least one of the detection units 70 is provided on the insulation portion 60. Two pieces of the detection units 70 are provided in the heater 1*a* exemplified in FIG. 8 and FIG. 9.

As illustrated in FIG. 8, a plurality of the detection units 70 are provided in a longitudinal direction (X-direction) of the substrate 10 and in a lateral direction (Y-direction) of the substrate 10 with a predetermined interval. When the plurality of detection units 70 are provided in the longitudinal direction (X-direction) of the substrate and the lateral direction (Y-direction) of the substrate 10 with a predetermined interval, a variation in an in-plane temperature of the substrate 10, and a variation in an in-plane temperature of the heater 1*a* can be detected. Accordingly, for example, electric power applied to the heat generation bodies 30 can be controlled so that a variation of the temperature in the longitudinal direction (X-direction) of the substrate 10 decreases. The number, an interval, arrangement, and the like of the detection units 70 can be appropriately changed in correspondence with the size of the heater 1*a* (substrate 10), specifications (for example, a heating temperature or a permissible temperature variation range) of the heater 1*a*, and the like. The number, the interval, the arrangement, and the like of the detection units 70 can be appropriately determined, for example, by performing an experiment or a simulation.

As illustrated in FIG. 8, for example, the wiring 80 includes a terminal 81 (corresponding to an example of a fourth terminal) and wirings 82*a* to 82*d*. The terminal 81, and the wirings 82*a*to 82*d* can be integrally formed. For example, a material and a forming method of the wiring 80 can be set to be similar to the material and the forming method of the wiring 31 as described above. The number of the terminal 81 and the number of the wirings 82*a* to 82*d* can be appropriately changed in correspondence with the number of the detection units 70.

For example, one terminal 81 can be provided with respect to one detection unit 70. The terminal 81 is electrically connected to the detection unit 70. In the heater 1*a* exemplified in FIG. 8 and FIG. 9, since two detection units 70 are provided, two terminals 81 are provided. The two terminals 81 are provided on the insulation portion 60 in the vicinity of an end of the substrate 10 on a side where terminals 44 (corresponding to an example of a third terminal) are provided. The two terminals 81 can be provided in parallel with each other in the lateral direction (Y-direction) of the substrate 10 with a predetermined interval. That is, in the heater 1*a* according to this embodiment, the two terminals 81 are integrated in the vicinity of one end of the substrate 10.

Note that, details of the wirings 82*a* to 82*d* will be described later.

As illustrated in FIG. 8, for example, the protective portion 90 is provided on the insulation portion 60 and covers the detection unit 70 and the wirings 82*a* to 82*d*. In this case, the terminals 81 are exposed from the protective portion 90.

For example, the protective portion 90 has a function of insulating the detection unit 70 and the wirings 82*a* to 82*d*, and a function of protecting the detection unit 70 and the wirings 82*a* to 82*d* from an external force, a corrosive gas, and the like. A material and a forming method of the protective portion 90 can be set to be similar to the material and the forming method of the protective portion 50 as described above.

Here, a thermal stress occurs due to a difference in a coefficient of thermal expansion of materials when using the heater 1*a*, or when manufacturing the heater 1*a* (for example, when firing the protective portion 90 or the like). Therefore, there is a concern that warpage may occur in the heater 1*a* due to the thermal stress. When the warpage occurs in the heater 1*a*, there is a concern that a distance between the heater 1*a* and an object to be heated varies, and heating unevenness may occur in the object to be heated.

In the heater 1*a* according to this embodiment, as illustrated in FIG. 9, the insulation portion 20, the heat generation body 30, the wiring 42, and the protective portion 50 are provided on the surface 10*a* side of the substrate 10. The insulation portion 60, the detection unit 70, the wiring 80, and the protective portion 90 are provided on the surface 10*b* side of the substrate 10. In addition, a material of the insulation portion 60 can be set to be similar to the material of the insulation portion 20. A material of the protective portion 90 can be set to be the same as the material of the protective portion 50.

Accordingly, a thermal stress generated due to the substrate 10, the insulation portion 20, and the protective portion 50 on the surface 10*a* side of the substrate 10 can be cancelled by a thermal stress generated due to the substrate 10, the insulation portion 60, and the protective portion 90 on the surface 10*b* side of the substrate 10. When the thermal stress is cancelled, warpage can be suppressed from occurring in the heater 1*a*.

For example, when the thickness of the insulation portion 20 and the thickness of the insulation portion 60 are set to be approximately the same as each other, and the thickness of the protective portion 50 and the thickness of the protective portion 90 are set to be approximately the same as each other, a value of the thermal stress generated on the surface 10*a* side of the substrate 10 and a value of the thermal stress generated on the surface 10*b* side of the substrate 10 can be set to be approximately the same as each other. According to this, warpage can be effectively suppressed from occurring in the heater 1*a*.

In addition, for example, even when a value of the sum of the thickness of the insulation portion 20 and the thickness of the protective portion 50, and a value of the sum of the thickness of the insulation portion 60 and the thickness of the protective portion 90 are set to be approximately the same as each other, the value of the thermal stress generated on the surface 10*a* side of the substrate 10 and the value of the thermal stress generated on the surface 10*b* side of the substrate 10 can be set to be approximately the same as each other. According to this, warpage can be effectively suppressed from occurring in the heater 1*a*.

Next, the wirings 82*a* to 82*d* will be further described.

First, description will be given of a wiring of the detection unit 70 according to a comparative example.

Figure 10:
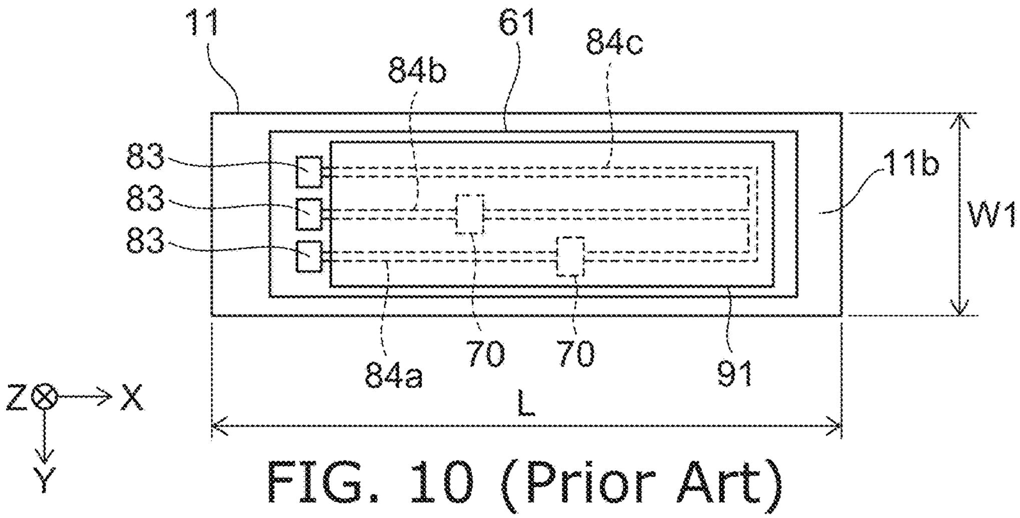
FIG. 10 (Prior Art)
FIG. 10 is a schematic view exemplifying wiring of detection units according to a comparative example.

FIG. 10 is a schematic view exemplifying wiring of the detection units 70 according to the comparative example.

As illustrated in FIG. 10, an insulation portion 61 has an insulation property and is provided on the surface 11*b* of the substrate 11. The detection units 70 are provided on the insulation portion 61. The number, an interval, and an arrangement of the detection units 70 can be set to be similar as in the exemplification in FIG. 8.

Three terminals 83 are provided. One of the three terminals 83 is set to be common to two detection units 70. The three terminals 83 are provided in the vicinity of an end of the substrate 11 on one side in the longitudinal direction (X-direction). The three terminals 83 are provided in parallel with each other in the lateral direction (Y-direction) of the substrate 11 with a predetermined interval.

One of the detection units 70 is electrically connected to one of the terminals 83 through a wiring 84*a*. The other detection unit 70 is electrically connected to another terminal 83 through a wiring 84*b*. In addition, the two detection units 70 are electrically connected to the remaining terminal 83 through a common wiring 84*c*.

The two detection units 70 and the wirings 84*a* to 84*c* are covered with a protective portion 91. The three terminals 83 are exposed from the protective portion 91.

Even in this aspect, the two detection units 70 can be wired. However, in this aspect, as can be seen from FIG. 10, the three wirings 84*a* to 84*c* extending in the longitudinal direction (X-direction) of the substrate 11 are arranged in parallel in the lateral direction (Y-direction) of the substrate 11. Therefore, the width dimension W1 (a dimension in the lateral direction; a dimension in the Y-direction) of the substrate 11 increases. When the width dimension W1 of the substrate 11 increases, it is difficult to accomplish a reduction in size of the heater.

Here, in the heater 1*a* according to this embodiment, the substrate 10 having electrical conductivity is set as a wiring common to the two detection units 70.

As illustrated in FIG. 8, the wiring 82*a* is provided on the insulation portion 60, and is electrically connected to one of the terminals 81 and one of the detection units 70. The wiring 82*b* is provided on the insulation portion 60 and one end of the wiring 82*b* is electrically connected to the detection unit 70 to which the wiring 82*a* is electrically connected. The wiring 82*b* extends in the longitudinal direction (X-direction) of the substrate 10, and an end opposite to the detection unit 70 side is electrically connected to the substrate 10 on an outer side of the insulation portion 60.

The wiring 82*c* is provided on the insulation portion 60 and is electrically connected to the other terminal 81 and the other detection unit 70. The wiring 82*d* is provided on the insulation portion 60 and one end of the wiring 82*d* is electrically connected to the detection unit 70 to which the wiring 82*c* is electrically connected. The wiring 82*d* extends in the longitudinal direction (X-direction) of the substrate 10 and an end opposite to the detection unit 70 side is electrically connected to the substrate 10 on an outer side of the insulation portion 60.

A material and a forming method of the terminals 81 and the wirings 82*a* to 82*d* can be set to be similar to the material and the forming method of the terminals 32 and the wiring 31 as described above.

In addition, as illustrated in FIG. 8, in the longitudinal direction (X-direction) of the substrate 10, the vicinity of an end of the surface 10*b* of the substrate 10 on a side where the terminals 81 are provided is exposed from the insulation portion 60. As described above, the substrate 10 is formed from a material having electrical conductivity. In addition, ends of the wirings 82*b* and 82*d* are electrically connected to the surface 10*b* of the substrate 10 on an outer side of the insulation portion 60. According to this, the substrate 10 functions as a wiring and a terminal which are electrically connected to the detection units 70 (wirings 82*b* and 82*d*).

For example, as illustrated in FIG. 8, the vicinity of an end of the substrate 10 on a side where the terminals 81 are provided functions as a terminal 81*a* that is electrically connected to the detection units 70 through the wirings 82*b* and 82*d*.

As illustrated in FIG. 7 and FIG. 8, in the longitudinal direction (X-direction) of the substrate 10, when the terminals 44, the terminals 81, and the terminal 81*a* are provided in the vicinity of an end of the substrate 10 on the same side, the heater 1 and an external device can be electrically connected with one harness. According to this, simplification of routing of the harness, a reduction in a wiring space, easiness of wiring of the harness, shortening of wiring time, and the like can be accomplished.

In addition, since the substrate 10 having electrical conductivity functions as a wiring that is electrically connected to the detection units 70 (the wirings 82*b* and 82*d*), it is not necessary to fold back the wirings 82*b* and 82*d* to the terminal 81 side. Accordingly, the dimension of the substrate 10 in the lateral direction (Y-direction) can be reduced, and thus a reduction in size of the heater 1 can be accomplished.

Figure 11:
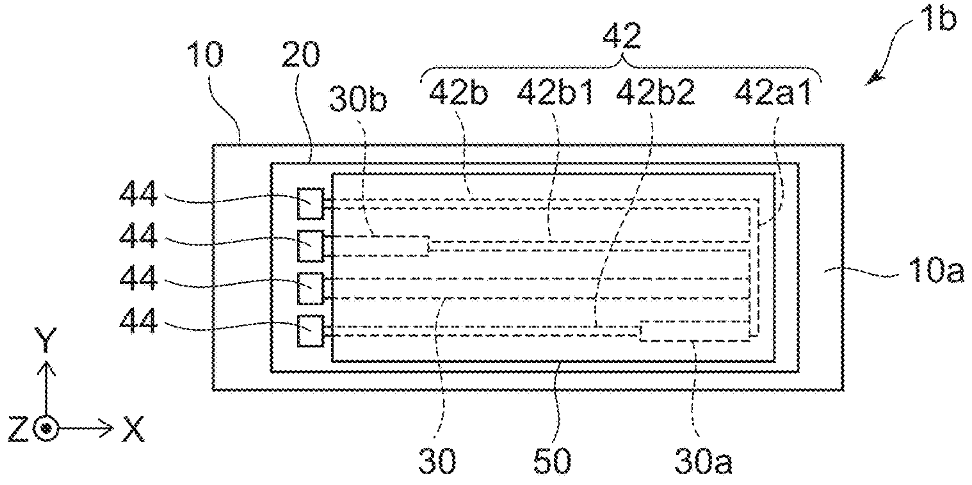
FIG. 11 is a schematic view when a heater according to another embodiment is viewed from one side in the Z-direction.

FIG. 11 is a schematic view when a heater 1*b* according to another embodiment is viewed from one side in the Z-direction.

Figure 12:
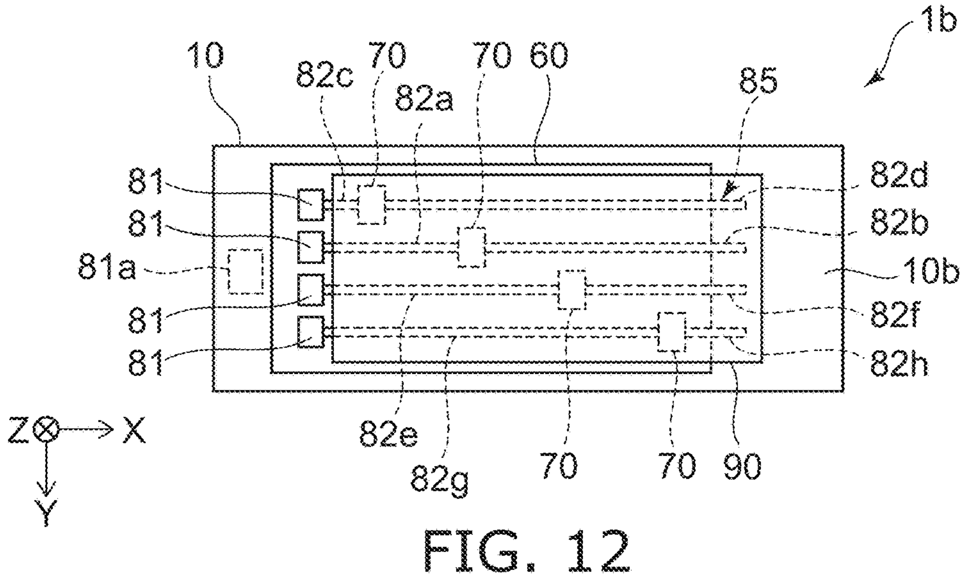
FIG. 12 is a schematic view when the heater is viewed from the other side in the Z-direction.

FIG. 12 is a schematic view when the heater 1*b* is viewed from the other side in the Z-direction.

As illustrated in FIG. 11 and FIG. 12, for example, the heater 1*b* includes the substrate 10, the insulation portion 20, heat generation bodies 30, 30*a*, and 30*b*, a wiring 42, the protective portion 50, the insulation portion 60, the detection unit 70, a wiring 85, and the protective portion 90.

That is, in the heater 1*b*, the heat generation bodies 30*a* and 30*b* are added to the above-described heater 1*a*, and four pieces of the detection units 70 are provided.

The heat generation bodies 30, 30*a*, and 30*b* are provided in parallel with each other in the lateral direction (Y-direction) of the substrate 10 with a predetermined interval. The length of the heat generation bodies 30*a* and 30*b* in the longitudinal direction (X-direction) of the substrate 10 is shorter than the length of the heat generation body 30. In the lateral direction (Y-direction) of the substrate 10, the heat generation body 30*a* is provided on one side of the heat generation body 30, and the heat generation body 30*b* is provided on the other side of the heat generation body 30. In the longitudinal direction (X-direction) of the substrate 10, the heat generation body 30*a* is provided in the vicinity of an end of the heat generation body 30 on a side opposite to a terminal 44 side. The heat generation body 30*b* is provided in the vicinity of an end of the heat generation body 30 on a terminal 44 side. For example, a material and a forming method of the heat generation bodies 30*a* and 30*b* can be set to be similar to the material and the forming method of the heat generation body 30 as described above.

Terminals 44 and the wiring 42 are provided on the insulation portion 20. The terminals 44 and the wiring 42 can be integrally formed. For example, a material and a forming method of the terminals 44 and the wiring 42 can be set to be similar to the material and the forming method of the terminals 32 and the wiring 31 as described above.

Four pieces of the terminals 44 are provided. One terminal 44 is provided with respect to each of the heat generation bodies 30, 30*a*, and 30*b*. In addition, one terminal 44 common to the heat generation bodies 30, 30*a*, and 30*b* is provided. The four terminals 44 are provided in the vicinity of one end of the substrate 10 in the longitudinal direction (X-direction). The four terminals 44 can be provided in parallel with each other in the lateral direction (Y-direction) of the substrate 10 with a predetermined interval.

That is, in the heater 1*b*, the four terminals 44 are integrated in the vicinity of the one end of the substrate 10.

The wiring 42 includes a portion 42*a*1, a portion 42*b*, a portion 42*b*1, and a portion 42*b*2. The portion 42*a*1 is provided in the vicinity of an end of the substrate 10 on a side opposite to a side where the terminals 44 are provided in the longitudinal direction (X-direction) of the substrate 10. The portion 42*a*1 extends in the lateral direction (Y-direction) of the substrate 10.

The portion 42*b* is provided in the vicinity of a peripheral edge of the substrate 10 in the lateral direction (Y-direction) of the substrate 10. The portion 42*b* extends in the longitudinal direction (X-direction) of the substrate 10 and is electrically connected to one of the terminals 44 and the portion 42*a*1.

The portion 42*b*1 extends in the longitudinal direction (X-direction) of the substrate 10 and is electrically connected to the heat generation body 30*b* and the portion 42*a*1. An end of the heat generation body 30*b* on a side opposite to a side to which the portion 42*b*1 is electrically connected is electrically connected to one of the terminals 44. The terminal 44 and the heat generation body 30*b* may be directly connected or a wiring may be provided between the terminal 44 and the heat generation body 30*b*.

The portion 42*b*2 extends in the longitudinal direction (X-direction) of the substrate 10 and is electrically connected to the heat generation body 30*a* and one of the terminals 44.

The heat generation body 30 extends in the longitudinal direction (X-direction) of the substrate 10 and is electrically connected to one of the terminals 44 and the portion 42*a*1. The terminal 44 and the heat generation body 30 may be directly connected or a wiring may be provided between the terminal 44 and the heat generation body 30. The portion 42*a*1 and the heat generation body 30 may be directly connected or a wiring may be provided between the portion 42*a*1 and the heat generation body 30.

For example, the protective portion 50 is provided on the insulation portion 20 and covers the heat generation bodies 30, 30*a*, and 30*b*, and the wiring 42 (the portion 42*a*1, the portion 42*b*, the portion 42*b*1, and the portion 42*b*2). In this case, the terminals 44 are exposed from the protective portion 50.

As illustrated in FIG. 12, four pieces of the detection units 70 are provided on the insulation portion 60. The four detection units 70 are provided in the longitudinal direction (X-direction) of the substrate 10 and the lateral direction (Y-direction) of the substrate with a predetermined interval.

The wiring 85 includes four terminals 81 and wirings 82*a* to 82*g*. The four terminals 81 and the wirings 82*a* to 82*g* can be integrally formed. For example, a material and a forming method of the wiring 85 can be set to be similar to the material and the forming method of the wiring 42 as described above. The number of the terminals 81 and the number of the wirings 82*a* to 82*h* can be appropriately changed in correspondence with the number of the detection units 70.

For example, one of the terminals 81 can be provided with respect to one of the detection units 70. In the heater 1*b* exemplified in FIG. 12, since four detection units 70 are provided, four terminals 81 are provided. The four terminals 81 are provided in the vicinity of an end on a side where the four terminals 44 are provided in the longitudinal direction (X-direction) of the substrate 10. The four terminals 81 can be provided in parallel with each other in the lateral direction (Y-direction) of the substrate 10 with a predetermined interval. That is, in the heater 1*b*, the four terminals 81 are integrated in the vicinity of one end of the substrate 10.

The wiring 82*a* is provided on the insulation portion 60 and is electrically connected to one of the terminals 81 and one of the detection units 70. The wiring 82*b* is provided on the insulation portion 60 and one end of the wiring 82*b* is electrically connected to the detection unit 70 to which the wiring 82*a* is electrically connected. The wiring 82*b* extends in the longitudinal direction (X-direction) of the substrate 10, and an end on a side opposite to a detection unit 70 side is electrically connected to the substrate 10 on an outer side of the insulation portion 60.

The wiring 82*c* is provided on the insulation portion 60 and is electrically connected to one of the terminals 81 and one of the detection units 70. The wiring 82*d* is provided on the insulation portion 60 and one end of the wiring 82*d* is electrically connected to the detection unit 70 to which the wiring 82*c* is electrically connected. The wiring 82*d* extends in the longitudinal direction (X-direction) of the substrate 10, and an end on a side opposite to the detection unit 70 side is electrically connected to the substrate 10 on an outer side of the insulation portion 60.

The wiring 82*e* is provided on the insulation portion 60 and is electrically connected to one of the terminals 81 and one of the detection units 70. The wiring 82*f* is provided on the insulation portion 60 and one end of the wiring 82*f* is electrically connected to the detection unit 70 to which the wiring 82*e* is electrically connected. The wiring 82*f* extends in the longitudinal direction (X-direction) of the substrate 10, and an end on a side opposite to the detection unit 70 side is electrically connected to the substrate 10 on an outer side of the insulation portion 60.

The wiring 82*g* is provided on the insulation portion 60 and is electrically connected to one of the terminals 81 and one of the detection units 70. The wiring 82*h* is provided on the insulation portion 60, and one end of the wiring 82*h* is electrically connected to the detection unit 70 to which the wiring 82*g* is electrically connected. The wiring 82*h* extends in the longitudinal direction (X-direction) of the substrate 10, and an end on a side opposite to the detection unit 70 side is electrically connected to the substrate 10 on an outer side of the insulation portion 60.

A material and a forming method of the terminals 81 and the wirings 82*a* to 82*h* can be set to be similar to the material and the forming method of the terminals 32 and the wiring 31 as described above.

For example, the protective portion 90 is provided on the insulation portion 60 and covers the detection units 70 and the wirings 82*a* to 82*h*. In this case, the terminals 81 are exposed from the protective portion 90.

Even in the heater 1*b*, the substrate 10 having electrical conductivity functions as a wiring and a terminal which are electrically connected to the detection units 70 (the wirings 82*b*, 82*d*, 82*f*, and 82*h*). For example, as illustrated in FIG. 12, the vicinity of an end of the substrate 10 on a side where the terminals 81 are provided functions as the terminal 81*a* that is electrically connected to the detection units 70 through the wirings 82*b*, 82*d*, 82*f*, and 82*h*.

As illustrated in FIG. 12, in the longitudinal direction (X-direction) of the substrate 10, when the terminals 44, the terminals 81, and the terminal 81*a* are provided in the vicinity of an end of the substrate 10 on the same side, the heater 1*b* and an external device can be electrically connected by one harness. According to this, simplification of routing of the harness, a reduction in a wiring space, easiness of wiring of the harness, shortening of wiring time, and the like can be accomplished.

In addition, since the substrate 10 having electrical conductivity functions as a wiring that is electrically connected to the detection units 70 (the wirings 82*b*, 82*d*, 82*f*, and 82*h*), it is not necessary to fold back the wirings 82*b*, 82*d*, 82*f*, and 82*h* to the terminal 81 side. Accordingly, the dimension of the substrate 10 in the lateral direction (Y-direction) can be reduced, and thus a reduction in size of the heater 1*b* can be accomplished.

(Image Forming Apparatus) In an exemplary embodiment, an image forming apparatus 100 including the heater 1 (1*a* or 1*b*) can be provided. Both the description relating to the above-described heater 1 and the modification examples of the heater 1 (for example, the heaters 1*a* and 1*b*) are applicable to the image forming apparatus 100.

Note that, hereinafter, description will be given of a case where the image forming apparatus 100 is a copier as an example.

Figure 13:
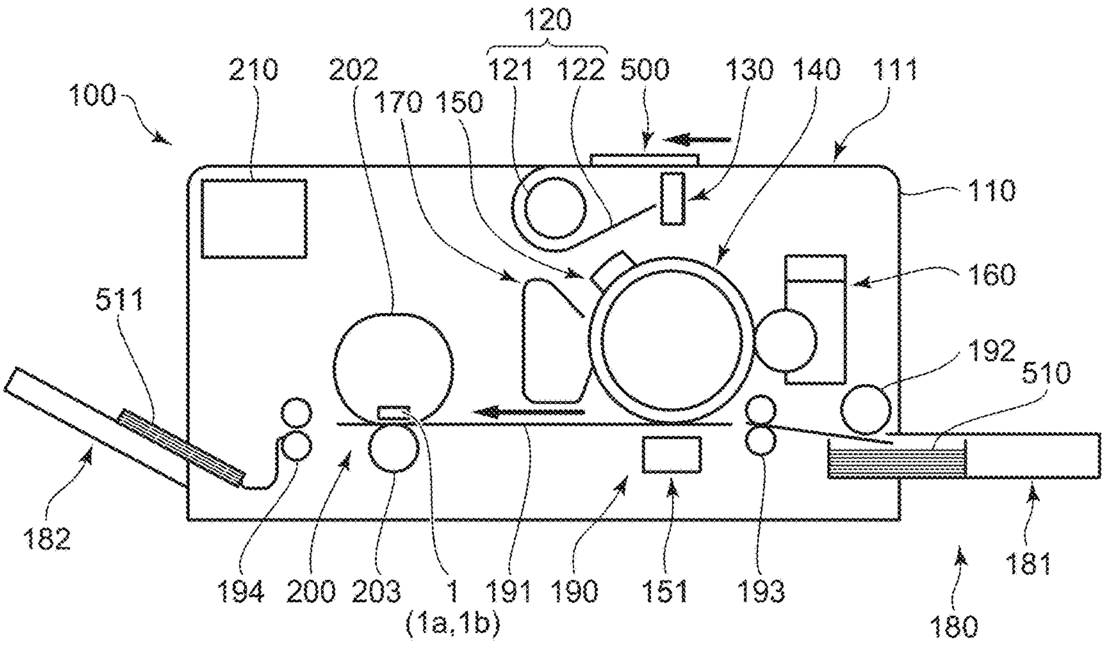
FIG. 13 is a schematic view exemplifying an image forming apparatus according to an embodiment.

However, the image forming apparatus 100 is not limited to the copier, and may be an apparatus provided with a heater configured to fix a toner. For example, the image forming apparatus 100 can be set as a printer, a rewritable card reader and writer, or the like. FIG. 13 is a schematic view exemplifying the image forming apparatus 100 according to this embodiment.

Figure 14:
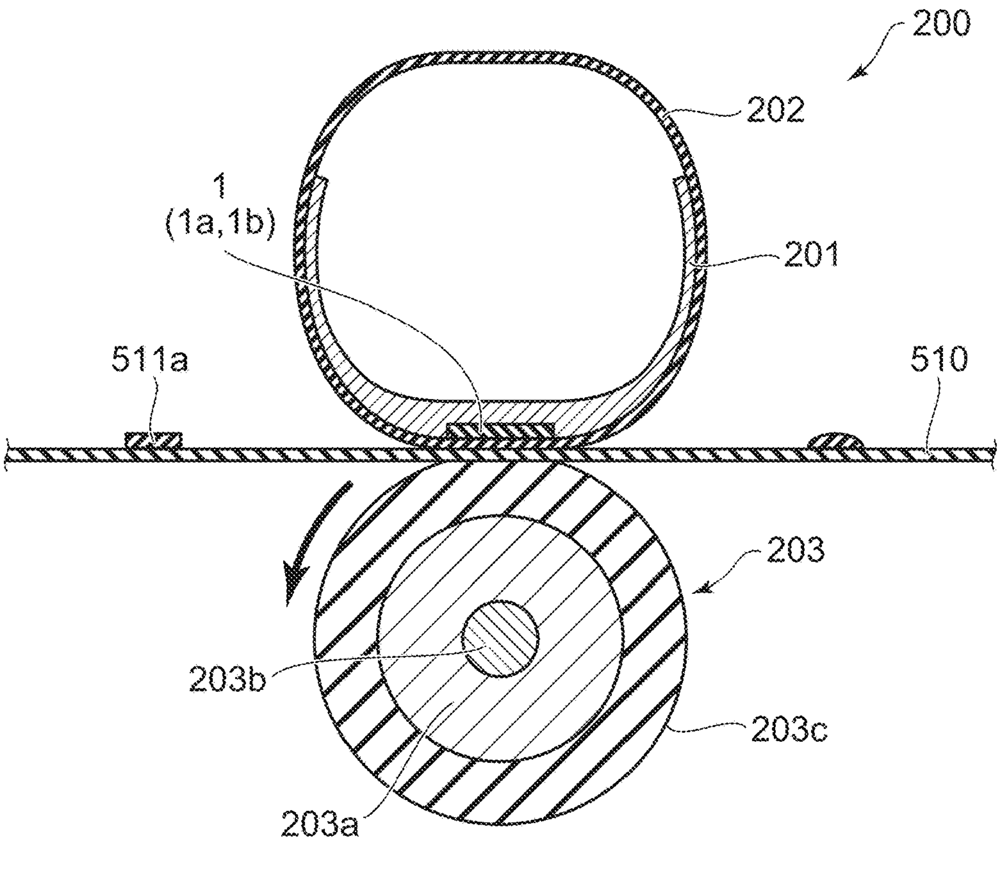
FIG. 14 is a schematic view exemplifying a fixing unit.

FIG. 14 is a schematic view exemplifying a fixing unit 200.

As illustrated in FIG. 13, for example, the image forming apparatus 100 includes a frame 110, an illumination unit 120, an imaging element 130, a photosensitive drum 140, a charging unit 150, a discharging unit 151, a developing unit 160, a cleaner 170, an accommodation unit 180, a conveying unit 190, the fixing unit 200, and a controller 210.

The frame 110 has a box shape, and accommodates the illumination unit 120, the imaging element 130, the photosensitive drum 140, the charging unit 150, the developing unit 160, the cleaner 170, a part of the accommodation unit 180, the conveying unit 190, the fixing unit 200, and the controller 210 at the inside.

A window 111 using a translucent material such as glass can be provided on an upper surface of the frame 110. An original document 500 to be copied is placed on the window 111. In addition, a movement unit configured to move a position of the original document 500 can be provided.

The illumination unit 120 is provided in the vicinity of the window 111. For example, the illumination unit 120 includes a light source 121 such as a lamp and a reflecting mirror 122.

The imaging element 130 is provided in the vicinity of the window 111.

The photosensitive drum 140 is provided on a downward side of the illumination unit 120 and the imaging element 130. The photosensitive drum 140 is rotatably provided. For example, a zinc oxide photosensitive layer or an organic semiconductor photosensitive layer is provided on a surface of the photosensitive drum 140.

The charging unit 150, the discharging unit 151, the developing unit 160, and the cleaner 170 are provided at the periphery of the photosensitive drum 140.

For example, the accommodation unit 180 has a cassette 181 and a tray 182. The cassette 181 detachably attached to one side portion of the frame 110. The tray 182 is provided on a side portion of the frame 110 which is opposite to the side to which the cassette 181 is attached. Paper 510 (for example, white paper) before performing copying is accommodated in the cassette 181. Paper 511 to which a copy image 511*a* is fixed is accommodated in the tray 182.

The conveying unit 190 is provided on a downward side of the photosensitive drum 140. The conveying unit 190 conveys the paper 510 between the cassette 181 and the tray 182. For example, the conveying unit 190 includes a guide 191 that supports the conveyed paper 510 and conveying rollers 192 to 194 which convey the paper 510. In addition, a motor configured to rotate the conveying rollers 192 to 194 can be provided in the conveying unit 190.

The fixing unit 200 is provided downstream of the photosensitive drum 140 (tray 182 side).

As illustrated in FIG. 14, for example, the fixing unit 200 includes the heater 1 (1*a* or 1*b*), a stay 201, a film belt 202, and a pressing roller 203.

The heater 1 (1*a* or 1*b*) is attached to a paper 510 conveying line side in the stay 201. The heater 1 (1*a* or 1*b*) can be embedded in the stay 201. For example, a side of the heater 1 (1*a* or 1*b*) where the protective portion 50 is provided can be exposed from the stay 201.

The film belt 202 covers the stay 201 provided with the heater 1 (1*a* or 1*b*). For example, the film belt 202 can be formed from a heat-resistant resin such as polyimide.

The pressing roller 203 is provided to face the stay 201. For example, the pressing roller 203 includes a cored bar 203*a*, a drive shaft 203*b*, and an elastic portion 203*c*. The drive shaft 203*b* protrudes from an end of the cored bar 203*a*, and is connected to a drive device such as a motor. The elastic portion 203*c* is provided on an outer surface of the cored bar 203*a*. The elastic portion 203*c* is formed from a heat-resistant elastic material. For example, the elastic portion 203*c* can be formed from a silicone resin or the like.

The controller 210 is provided inside the frame 110. For example, the controller 210 includes an operation unit such as a central processing unit (CPU), and a storage unit that stores a control program. The operation unit controls operations of respective elements provided in the image forming apparatus 100 on the basis of the control program stored in the storage unit. In addition, the controller 210 may include an operating unit configured to input copying conditions and the like by a user, a display unit configured to display an operation state, an abnormal display, or the like, and the like.

Note that, since a known technology is applicable for control of the respective elements provided in the image forming apparatus 100, detailed description will be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A heater, comprising:

a substrate that has electrical conductivity and extends in a first direction;

a first insulation portion that is provided on a first surface of the substrate, has an insulation property, and extends in the first direction;

at least one heat generation body that is provided on the first insulation portion and extends in the first direction;

a second insulation portion that is provided on a second surface of the substrate which is opposite to the first surface, has an insulation property, and extends in the first direction;

at least one detection unit that is provided on the first insulation portion; and a first wiring which is provided on the first insulation portion and extends in the first direction, and in which one end is electrically connected to one terminal of the detection unit and the other end is electrically connected to the substrate having the electrical conductivity, the first insulation portion has a hole passing through the first insulation portion in a thickness direction, the other end of the first wiring is electrically connected to the substrate through the hole of the first insulation portion, and the detection unit is in parallel with the heat generation body in a second direction orthogonal to the first direction, and detects a temperature of the heat generation body.

2. The heater according to claim 1, wherein a pair of the heat generation bodies are provided, and the detection unit is provided between the heat generation bodies in the second direction.

3. The heater according to claim 2, wherein in the second direction, a distance between the detection unit and one of the heat generation bodies is approximately the same as a distance between the detection unit and the other heat generation body.

4. The heater according to claim 1, further comprising:

a second wiring which is provided on the first insulation portion and extends in the first direction, and in which one end is electrically connected to the other terminal of the detection unit;

a first terminal that is electrically connected to the other end of the second wiring;

a second terminal that is electrically connected to one end of the heat generation body; and a first protective portion that is provided on the first insulation portion, covers the heat generation body, the detection unit, the first wiring, and the second wiring, and has an insulation property, wherein the first terminal and the second terminal are exposed from the first protective portion, and are in parallel with each other in the second direction, and the vicinity of an end of the substrate on a side where the first terminal and the second terminal are provided is exposed from the first insulation portion.

5. The heater according to claim 4, wherein the first protective portion contains a glass material to which a filler containing an aluminum oxide is added.

6. The heater according to claim 5, wherein heat conductivity of the glass material to which the filler containing the aluminum oxide is added is 2[W/(m·K)] or more.

7. The heater according to claim 4, wherein the first wiring and the second wiring are wirings.

8. The heater according to claim 1, wherein a plurality of the heat generation bodies are provided, and the plurality of heat generation bodies are provided in parallel with a predetermined interval in a second direction orthogonal to the first direction.

9. The heater according to claim 1, wherein a plurality of the detection units are provided, and the first wiring is electrically connected to each of the plurality of detection units.

10. The heater according to claim 1, wherein the substrate contains a metal.

11. The heater according to claim 1, wherein the heat generation body contains at least one of a ruthenium oxide (RuO2) and a silver-palladium (Ag-Pd) alloy.

12. The heater according to claim 1, wherein the substrate having electrical conductivity functions as a wiring that is electrically connected to the first wiring.

13. The heater according to claim 1, wherein the thickness of the second insulation portion is the same as or larger than the thickness of the first insulation portion.

14. The heater according to claim 1, wherein the detection unit is a thermistor.

15. An image forming apparatus, comprising:

the heater according to claim 1.

* * * * *